United States Patent [19]
Knuuttila et al.

[11] Patent Number: 5,183,794
[45] Date of Patent: Feb. 2, 1993

[54] METHOD FOR PREPARING A CATALYST FOR POLYMERIZATION OF OLEFINS

[75] Inventors: Hilkka Knuuttila, Porvoo; Eeva-Liisa Lakomaa, Espoo, both of Finland

[73] Assignee: Neste Oy, Espoo, Finland

[21] Appl. No.: 641,907

[22] Filed: Jan. 16, 1991

[30] Foreign Application Priority Data

Jan. 16, 1990 [FI] Finland ............................ 900256

[51] Int. Cl.$^5$ .......................... B01J 21/06; B01J 23/26
[52] U.S. Cl. .................................. 502/242; 502/306; 502/309
[58] Field of Search .................. 502/242, 309, 306

[56] References Cited

U.S. PATENT DOCUMENTS

| | | | |
|---|---|---|---|
| 3,887,494 | 6/1975 | Dietz | 252/152 |
| 4,186,260 | 1/1980 | Dietz | 526/106 |
| 4,262,102 | 4/1981 | Hoff et al. | 502/242 |
| 4,312,967 | 1/1982 | Norwood et al. | 526/64 |
| 4,362,654 | 12/1982 | Vance et al. | 502/309 |

Primary Examiner—W. J. Shine
Attorney, Agent, or Firm—Birch, Stewart, Kolasch & Birch

[57] ABSTRACT

The present invention concerns a catalyst for the polymerization of olefins, and a method for preparing the same said catalyst constituting an inorganic support material with catalytically active chromium and titanium compounds bound on its surface. The catalyst is prepared according to the invention by bringing the catalytically active metal compounds sequentially in vapor phase onto the support material surface in excess amounts in relation to the binding sites available on the support material surface. The support material temperature is maintained above the condensation temperature of the vapor, preferably above 160° C., and simultaneously sufficiently high so as to achieve the thermal activation energy necessary for the generation of bonds between the support material and the catalytically active material or its compound. To avoid desorption of the chemisorbed compounds, the temperature is kept below approx. 500° C. The activity of a catalyst in accordance with the invention even with very low contents of the catalytic metals is as high as the activity of a catalyst of multiply higher metal contents that has been prepared by the methods of the conventional technoloyg.

18 Claims, No Drawings

METHOD FOR PREPARING A CATALYST FOR POLYMERIZATION OF OLEFINS

FIELD OF THE INVENTION

The present invention relates to a polymerization catalyst for olefins and method for producing the same, wherein the catalyst contains catalytically active chromium and titanium compounds bound on an inorganic support.

Such a catalyst typically consists of an inorganic support material onto whose surface the catalytically active chromium and titanium compounds are bound.

DESCRIPTION OF THE INVENTION

The conventional Phillips-type polymerization catalyst, which was invented by Hogan and Banks (Phillips Petroleum Co.) at the beginning of the 1950's, comprises silica gel supported chromium(VI)oxide.

The catalyst is conventionally prepared in an aqueous solution by impregnating the surface of a silica gel-/aluminium oxide or silica gel support typically with chromium trioxide ($CrO_3$) or a chromium compound that can be converted into chromium trioxide. After impregnation the product is calcined in dry air, the temperature being 400° C. or higher. During the calcination the chromium is bound to the surface of the support material, supposedly undergoing an esterification reaction with the superficial hydroxyl groups, thus forming Cr(VI) species on the surface.

According to the conventional technology, the catalyst is activated by reducing the chemisorbed chromium with either hydrogen, carbon monoxide or ethene, whereby coordinatively unsaturated chromium compounds that are active in polymerization are formed onto the support material surface.

The support material can be an inorganic oxide such as silica gel, aluminium oxide, silica gel/aluminium oxide, thorium oxide, zirconium oxide, magnesium oxide, titanium oxide, some mixture thereof or any other suitable support material, such as aluminium phosphate. The specific area of a support is relatively large, typically greater than 20 m²/g.

The characteristics of the catalyst can be modified by adhering a second metal compound to a chromium/silica gel catalyst. Thus, a titanium compound, such as a titanium ester [$Ti(OR)_4$], added to a single-metal $CrO_3$/silica gel catalyst reduces the induction time characteristic to a chromium oxide containing catalyst (allowing a rapid initiation of the polymerization reaction) and gives a faster polymerization rate.

When the chromium and titanium compounds are bound to the support material and calcined at elevated temperatures, a chemical environment different from that of a conventional Phillips catalyst is obtained. Thence, polyethylene manufactured with titanium/chromium catalysts has a higher melt index and wider distribution of molecular weight than that obtained with a standard $CrO_3/SiO_2$ catalyst.

According to prior art methods, titanium is conventionally deposited on the support material by either impregnating a suitable titanium compound onto the support material surface or by coprecipitating a titanium oxide/silica gel combination. An example of conventional preparation technique is given in the U.S. Pat. No. 4,186,260 for a catalyst preparation method, in which method the titanium compound is mixed with sulfuric acid, to which the precursor of the silica gel support is then added. The dried silica material is next impregnated with the chromium compound, and the impregnated silica gel support is activated by heating in air at approx. 500° to 1000° C. Another approach closer related to the coprecipitation technique is disclosed in the U.S. Pat. No. 3,887,494.

A drawback of the conventional preparation method of catalysts is the need for several different steps of preparation. Further, the preparation of a catalyst is very sensitive to the ambient conditions and requires thus a strict control. Another drawback is associated with the use of solvents. Namely, the solvents used in preparation often are capable of reacting with the support material thus causing changes in its surface structure.

In addition to the above-mentioned drawbacks, the solvents used are often contaminated with impurities that can adversely affect the activity of the catalyst.

Further, the above-described preparation methods of heterogeneous catalysts are difficult to apply to the control of the adsorption of catalytically active materials onto the support material surface, particularly when the surfaces of the powdered support material particles are structurally non-homogeneous. Due to these factors, the prior art methods are not easily applicable to a controlled adsorption of a metal or metal compound.

Moreover, the dispersion of catalytically active materials in the support material remains inferior with prior art methods.

A process different from that described above is taught by U.S. Pat. No. 4,312,967 for preparing a catalyst containing silica gel supported chromium oxide and titanium oxide (3 to 4% as Ti) and an organoborane. According to said patent, the titanium is added in the form of titanium isopropoxide to the chromium/silica gel catalyst in a fluidized bed, which is simultaneously purged with nitrogen at 149° C.

Even this approach fails to provide an efficient control of the binding of the active materials to the support.

SUMMARY OF THE INVENTION

It is an object of the present invention to overcome the drawbacks of conventional technology and achieve a novel chromium/titanium catalyst.

The invention is based on the concept of introducing the catalytically active metal compounds sequentially or simultaneously in vapour phase in at least an equal amount or, preferably, in excess amounts in relation to the number of available binding sites on the support material surface. The support temperature is maintained above the condensation temperature of the vapour, preferably above 160° C., and simultaneously sufficiently high so as to attain the thermal activation energy necessary for generation of bonds between the catalytically active material or its compound and the support material. To avoid the desorption of the chemisorbed compounds, the temperature is kept, however, below the temperature at which desorption starts at an essential rate. In the preparation of catalysts according to the invention, this temperature is at approx. 500° C. The support temperature may be approximately 175° to 360° C.

More specifically, the catalyst in accordance with the invention is principally characterized by being prepared by a) optionally subjecting support material to pretreatment by heat or chemical processing in order to modify its surface characteristics, b) vapourizing at least one precursor reagent of a catalytically active compound, c) routing the obtained reagent vapour into a reaction chamber where the vapour is brought to interact with the support material at about 160° to 500° C., d) maintaining the vapour pressure of the reagent sufficiently high and the duration of interaction with the support sufficiently long so as to provide at least an equal amount or, preferably, an excess of the reagent in relation to the available binding sties of the support material, e) removing the reagent not bound to the support material from the reaction chamber, f) repeating the process steps b) to e) at least once in order to bind another catalytically active compound to the support, and g) if necessary, posttreating the heterogeneous chromium containing catalyst in order to modify its catalytic activity.

DETAILED DESCRIPTION OF THE INVENTION

Surprisingly, it has been found that by binding the catalytically active compound in the above-described manner to the support, a heterogeneous catalyst can be provided the activity of which at even very low levels of catalytic metal content is as high as the activity of such a catalyst of multiple content of catalytically active compound that has been prepared by way of prior art methods.

According to the invention, all reagents necessary for binding the metal compound are brought into the reaction chamber in gaseous state, typically one at a time. During this process, the vapour pressure of the evaporated catalytically active compound is maintained sufficiently high and the duration of interaction with the surface of the support material sufficiently long so as to provide the compound in excess amounts in respect to the number of binding sites on the support material surface. Naturally, the actual number of the binding sites available on the support material surface itself is a crucial factor. This parameter is modifiable by pretreatment methods.

The reaction temperature must not fall below the temperature necessary for the evaporation of the compound in order to avoid condensation of the compound. Further, condensation of the compound on its way to the reaction space must be prevented by keeping the feed piping temperature at least at the evaporation temperature and preferably at or above the reaction temperature.

The metal compound and temperature used are selected so as to avoid decomposition of the metal compound and subsequent condensation of the decomposition products.

Using experimental methods, it is possible to determine a temperature range, or temperature span, in which the reaction is advantageously carried out. The lower limit of such a temperature span is determined by the condensation temperature of the metal compound to be evaporated at the applied partial pressure and by the activation energy necessary for establishing a desired surface bond. Obviously, the condensation temperature of the compound is not applicable as the lower temperature limit if the condensation temperature does not impart the reagent a sufficient energy to exceed the activation energy. The upper limit is determined by the temperature at which the compound chemisorbed on the support starts to exhibit an essential rate of desorption, that is, when the equilibrium of the chemisorption-desorption reaction has shifted toward desorption.

Since the activation and desorption energies are not generally known, the appropriate temperature must be found by experimental means.

The preparation of a catalyst in accordance with the invention includes the following optional steps:

Prior to the binding of the active metals, the support material can be pretreated in order to, e.g., reduce the number of hydroxyl groups on the support material surface by conventional means, one of which is heating in air stream at, e.g., 100°-800° C. The pretreatment can be performed before the support material is loaded into the reaction chamber, or alternatively, in the reaction chamber itself, prior to the introduction of the vapour of the active metal compound into the reaction chamber.

The support material surface can also be modified chemically by, for instance, water vapour in order to generate hydroxyl groups onto the surface. The chemical treatment can alternatively use a dehydrating agent in order to reduce the number of hydroxyl groups. Further, the support can be treated with a volatile metal compound such as an aluminium compound.

Moreover, it is possible to combine the above-mentioned heat treatment with the chemical treatment, whereat the support first is heated to or at the desired temperature, after which the chemical compound such as water vapour, for instance, is brought to interaction with the surface. Thus, according to one preferred embodiment of the invention, the support is pretreated at an elevated temperature in order to remove adsorbed water. After this, it is further possible to alter the temperature of the support material and allow water vapour to attack the support material surface to form new hydroxyl groups on it by chemisorption.

The temperature during the actual reaction is the same as or different from the pretreatment temperature. When chromyl chloride is used as the chromium reagent and the support comprises silica gel (or silicon oxide), the temperature is preferably kept in the range from 150° to 500° C. According to one preferred embodiment, the temperature is maintained below 360° C. According to a second preferred embodiment, the pretreatment to be described below is performed at a temperature higher than that used in the actual reaction. Thus, a high Cr content is attained by heating the support at a temperature above approx. 350° C. and by carrying out the actual reaction at temperatures below approx. 300° C.

The chromium reagent is, e.g., selected from the group consisting of chromyl chloride, chromyl fluorochloride and chromyl fluoride.

For titanium, the reagent can be, e.g., titanium tetrachloride. The temperature span applicable for the binding reaction of titanium can be the same as for chromium.

The chromium and titanium reagents can be introduced simultaneously or sequentially in a desired order. Thus, the chromium oxide can be bound first onto the support material surface, followed by the treatment with water vapour for the modification of the support surface. Then, the titanium reagent is fed into the reaction chamber either at the same or at a different temperature. It is often preferred to operate at one single temperature. Further, the order of introduction can be reversed for the reagents, that is, the titanium reagent can be introduce first and thereafter the chromium reagent.

As described above, the number of available binding sites affects the amount of active metal binding to the support. Therefore, the pretreatment and/or intermediate treatment of the support are factors of essential importance. These treatments affecting the support material can be performed in a desired order at any stage of the process before the catalyst is removed from the reaction chamber.

The proportion of excess active material in relation to the concentration necessary to achieve a full saturation of all available binding sites on the support material surface (customarily called a monolayer coverage) is typically 1.5- to 1000-fold, preferably about 2- to 100-fold. The amount of the chromium compound necessary for a monolayer coverage can be calculated from the area of the support material determined with the help of, e.g., the BET method, and from the known molecular structure of the support material surface.

According to the invention, the reaction between the vapour of the catalytically active metal compound and the support is carried out in an inert gas atmosphere or, alternatively, at reduced pressure, preferably using an protecting gas atmosphere of 1 to 100 mbar pressure. Also, the optional pre- and posttreatment steps are performed under the same conditions as the actual reaction. A benefit gained from the use of reduced pressure is that the reaction space is kept cleaner and the diffusion rate is increased. The reaction time is principally affected by the diffusion of vapour molecules into the support material pores and the delay time of the molecules on the support surface prior to chemisorption. The diffusion of the vapour molecules between the support material particles is extremely rapid in comparison with their diffusion into the pores. The reaction time is selected to be sufficiently long to allow the vapour containing the metal/metal compound to reach adequate interaction with the binding sites of the support. In the tests performed, a reaction time of 1 to 4 h proved sufficient for the purpose.

The evaporated reagent can be fed into the reaction chamber as such, or alternatively, using as a carrier an inert gas such as nitrogen or noble gases.

In the catalyst according to the invention, the support materials are preferably comprise of inorganic oxides. In particular, the support materials are selected from the group consisting of silica gel (silica), aluminium oxide, thorium oxide, zirconium oxide, magnesium oxide titanium oxide and mixtures thereof.

The excess of the active metal compound introduced in each reaction step is removed prior to the start of the next step by, for instance, flushing the reaction space with an inert gas.

After the binding of the active metal, the catalyst is activated by heating under oxidizing conditions up to a temperature ranging from about 400° C. to about 1000° C. The activation is preferably carried out in the same reaction chamber, but can alternatively be performed later in a separate reaction vessel at any instant prior to the use of the catalyst in polymerization. The oxidizing conditions can be provided with the help of an oxygen-containing gas such as air, for instance.

In the following section, the invention is illustrated with the help of a working example.

EXAMPLE

Three chromium- and titanium-containing catalysts were prepared. Chromyl chloride ($CrO_2Cl_2$) was used as the chromium reagent, while the titanium was obtained from titanium tetrachloride ($TiCl_4$). The silicon oxide support (EP 10 silica gel by Crosfield Catalysts) was weighed by 4 to 5.5 g, preheated at 360° to 455° C. temperature and 3 to 4 mbar pressure in nitrogen atmosphere for 17 to 20 h. After the preheating, the temperature was adjusted to the actual processing temperature. The operating conditions of the tests are given in Table 1 below:

TABLE 1

Operating conditions of Cr—Ti catalyst tests.

| Test no. | Preheating T[°C.] | Preheating t[h] | Reaction temp T[°C.] | CrO2Cl2 [mol/g/run] | Time [min] |
|---|---|---|---|---|---|
| 1.1 | 455 | 17 | 270 | 0.18 | 150 |
| 1.2 | 360 | 20 | 270 | 0.15 | 150 |
| 1.3 | 360 | 17 | 270 | 0.29 | 150 |

In test 1.1, after the preheating step, the support was treated with water vapour for 75 min at 360° C., after which the chromyl chloride was added. When the reaction was completed, a new water vapour treatment was carried out at 270° C., followed by the introduction of 0.13 mol of titanium tetrachloride ($TiCl_4$) per unit weight (g) of the support into the same reaction space at the same temperature for 184 minutes. Finally, a water vapour treatment for 75 minutes was performed.

In test 1.2, following the pretreatment, the support was o reacted with titanium tetrachloride (5 mmol/g of support) at 270° C. for 8.3 min, after which a water vapour treatment for 15 min at the same temperature was performed prior to the introduction of chromyl chloride into the reaction chamber.

In test 1.3 a Cr-containing silicon oxide catalyst was prepared as described in Example 1.1 above. The product thus prepared was reacted with titanium tetrachloride at 270° C. for 8.3 min. The amount of titanium tetrachloride used corresponded to 9.5 mmol Ti/g of support.

The prepared catalysts contained 0.016 to 0.47 % w/w chromium and 0.32 to 6.2 % w/w titanium.

The catalysts prepared for the evaluation of the activity were fluidized in dry air and heated first to 200° to 250° C., at which temperature they were held for 4 h, after which they were finally activated by calcination at an elevated temperature (690° to 790° C.) for about 5 h. The calcined material was cooled to 300° C. and the air atmosphere was replaced by oxygen-free nitrogen atmosphere.

The catalysts thus treated were used in the polymerization of ethene. The reaction temperature was 105° C. and the total pressure 4000 kPa. The hydrocarbon diluent in the polymerization process was isobutane. The results are shown in Table 2 below.

TABLE 2

Activities of Cr and Ti containing catalysts in polymerization of ethene.

| Test no. | Cr | Ti | Cl [%] | Activation temp [°C.] | Activity gPE/gcat*h) |
|---|---|---|---|---|---|
| 1.1 | 0.47 | 6.2 | | 730 | 1600 |
| 1.2 | 0.016 | 0.32 | | 690 | 500 |
| 1.3 | 0.29 | 1.3 | 3.2 | 790 | 1000 |

As evident from the results, the catalysts have a very high activity even in those cases where the metal contents are low.

What is claimed is:

1. A method for preparing a polymerization catalyst for olefins, said catalyst containing catalytically active chromium and titanium compounds bound on an inorganic support, wherein said method comprises the steps of:
   (a) vapourizing at least one precursor reagent of a catalytically active chromium or titanium compound;
   (b) routing the obtained reagent vapour from step (a) into a reaction chamber where the vapour is brought to interact with an inorganic support material at about 160° to 500° C.;
   (c) maintaining the vapour pressure of the reagent sufficiently high and the duration of interaction with the support sufficiently long so as to provide at least an equal amount or an excess amount of the reagent in relation to the available binding sites of the support material;
   (d) removing the reagent not bound to the support material from the reaction chamber; and
   (e) repeating the process step (a) through (d) at least once in order to bind at least another catalytically active compound to the support.

2. A method for preparing a catalyst in accordance with claim 1, wherein the reaction of step (b) is carried out at approximately 175° to 360° C.

3. A method for preparing a catalyst in accordance with claim 1 or 2, wherein the inorganic support material is pretreated before step (a) with heat at a temperature higher than that used during the reaction of step (b) in order to modify the surface characteristics thereof.

4. A method for preparing a catalyst in accordance with claim 3, wherein the pretreatment is carried out at a temperature above approximately 350° C. and the reaction of step (b) at a temperature below approximately 300° C.

5. A method for preparing a catalyst in accordance with claim 1, wherein the chromium compound is first bound onto the inorganic support material, and the titanium compound is subsequently bound in step (e) onto the inorganic support material.

6. A method for preparing a catalyst in accordance with claim 1, wherein the titanium compound is first bound onto the inorganic support material, and the chromium compound is subsequently bound in step (e) onto the inorganic support material.

7. A method for preparing a catalyst in accordance with claim 1, wherein the inorganic support is treated with water vapour at an elevated temperature after step (d).

8. A method for preparing a catalyst in accordance with claim 1, wherein the precursor reagent of the chromium compound used is selected from the group consisting of chromyl chloride, chromyl fluoride and chromyl fluoro-chloride, and the precursor reagent of the titanium compound is titanium tetrachloride.

9. A method for preparing a catalyst in accordance with claim 1, wherein the catalyst is posttreated by heating in air to 400° to 1000° C.

10. A method for preparing a catalyst in accordance with claim 1, wherein the actual reaction of step (c) is carried out under reduced pressure.

11. A method for preparing a catalyst in accordance with claim 1, wherein the support material comprises an inorganic oxide selected from the group consisting of silica gel, aluminum oxide, thorium oxide, zirconium oxide, magnesium oxide, titanium oxide and mixtures thereof.

12. A method for preparing a catalyst in accordance with claim 1, wherein the inorganic support material is pretreated chemically before step (a) with water vapour, a dehydrating agent or a volatile metal compound in order to modify the surface characteristics thereof.

13. A method for preparing a catalyst in accordance with claim 10, wherein said reduced pressure is 1 to 100 mbar.

14. A method for preparing a catalyst in accordance with claim 1, wherein the precursor reagent of the chromium compound used is selected from the group consisting of chromyl chloride, chromyl fluoride and chromyl fluoro-chloride, and the precursor reagent of the titanium compound is titanium tetrachloride, and wherein the support material comprises an inorganic oxide selected from the group consisting of silica gel, aluminum oxide, thorium oxide, zirconium oxide, magnesium oxide, titanium oxide and mixtures thereof.

15. A method for preparing a catalyst in accordance with claim 14, wherein the inorganic support material is pretreated before step (a) with heat at a temperature higher than that used during the reaction of step (b) in order to modify the surface characteristics thereof.

16. A method for preparing a catalyst in accordance with claim 15, wherein the pretreatment of is carried out at a temperature above approximately 350° C. and the reaction of step (b) at a temperature below approximately 300° C.

17. A method for preparing a catalyst in accordance with claim 14, wherein the catalyst is posttreated by heating in air to 400° to 1000° C.

18. A method for preparing a catalyst in accordance with claim 14, wherein reaction of step (c) is carried out under reduced pressure of from 1 to 100 mbar.

* * * * *